United States Patent
Rogge

Patent Number: 5,746,498
Date of Patent: May 5, 1998

[54] VEHICLE LAMP MOUNTABLE IN AN INTERIOR OF A VEHICLE, PARTICULARLY A RAISED AUXILIARY BRAKE LAMP

[75] Inventor: Ingo Rogge, Lippstadt, Germany

[73] Assignee: Hella KG Hueck & Co., Lippstadt, Germany

[21] Appl. No.: 624,472

[22] PCT Filed: Jul. 25, 1995

[86] PCT No.: PCT/EP95/02933

§ 371 Date: Apr. 3, 1996

§ 102(e) Date: Apr. 3, 1996

[87] PCT Pub. No.: WO96/04151

PCT Pub. Date: Feb. 15, 1996

[30] Foreign Application Priority Data

Aug. 3, 1994 [DE] Germany ............ 44 27 434.3

[51] Int. Cl.$^6$ ................................ B60Q 1/30
[52] U.S. Cl. ............ 362/80.1; 362/61; 362/374; 362/375
[58] Field of Search ............ 362/61, 80, 80.1, 362/226, 374, 375; 340/479

[56] References Cited

U.S. PATENT DOCUMENTS

| | | | |
|---|---|---|---|
| 4,463,411 | 7/1984 | Proctor | 362/61 |
| 4,628,417 | 12/1986 | Kaminski et al. | 362/80 |
| 4,654,757 | 3/1987 | Birkhauser | 362/61 |
| 5,113,320 | 5/1992 | Haydu | 362/61 |
| 5,142,454 | 8/1992 | Green | 362/61 |
| 5,331,522 | 7/1994 | Rives | 362/80.1 |
| 5,404,297 | 4/1995 | Birk et al. | 362/374 |

FOREIGN PATENT DOCUMENTS

| | | |
|---|---|---|
| 0 565 438 | 10/1993 | European Pat. Off. . |
| 77 39 340 | 4/1978 | Germany . |
| 30 17 405 | 11/1981 | Germany . |
| 83 03 898 | 7/1984 | Germany . |
| 89 10 909.0 | 12/1989 | Germany . |
| 89 13 812.0 | 2/1990 | Germany . |
| 91 14 246.6 | 2/1992 | Germany . |
| 41 37 612 | 5/1993 | Germany . |

*Primary Examiner*—Alan Cariaso
*Attorney, Agent, or Firm*—Griffin, Butler, Whisenhunt & Kurtossy

[57] ABSTRACT

This invention concerns an auxiliary brake light mountable in a cab of a vehicle which includes a housing on which a light-transmissive pane is snapped. According to the invention, a covering cap placed over the housing has an outer surface which forms the outer surface of the brake lamp that is seen from the interior of the cab. On side portions of the housing there ar two snapping tongues which are provided with protruding catch noses behind which snapping engaging elements formed on the interior of the covering cap engaged.

The covering cap is provided with detaching lashings for removal of the covering cap, which are formed by two curved slits. By applying exterior pressure to the detaching lashings the snapping tongues are pressed inwardly whereby the snapping engagement is released. The covering cap can have a color to match the cab interior while the housing can be manufacture in a single color for use with all color schemes.

6 Claims, 4 Drawing Sheets

VEHICLE LAMP MOUNTABLE IN AN INTERIOR OF A VEHICLE, PARTICULARLY A RAISED AUXILIARY BRAKE LAMP

BACKGROUND OF THE INVENTION

This invention relates to a vehicle lamp that is mountable in an interior of a vehicle, particularly a raised auxiliary brake lamp with a housing in which a transparent light body is fixedly mounted and which is provided with a lamp, and, as needed, a reflector, as well as electrical leads.

German Gebrauchsmuster 77 39 340 describes a vehicle lamp having a housing with spring tongues mounted thereon which extend into an interior of a box-like light body. Outwardly directed protrusions grip into openings of the light body. A disengagement of the housing from the light body is caused by exterior pressure on the protrusions of the spring tongues. Indeed no tools are necessary to bring about this disengagement for this known vehicle lamp; however, the visible protrusions of the spring tongues are very intrusive when the vehicle lamp is mounted in a vehicle interior. Further, the housing must be manufactured in many colors because it would also be very disturbing if vehicle lamps in only one color were available for all possible interior colors of a line of motor vehicles. Further, it is unavoidable that electrical contact elements are visible.

German DE 41 37 612 C1 discloses a license-plate lamp, which can be mounted on an exterior of a vehicle, having a housing with upper and lower parts which are self-engagingly snapped together. In a short side wall of the housing upper part there are two vertical, parallel, separated, slits which form tongues having interengaging members at their free ends which interengage with interengaging elements in the housing lower part. Also in this lamp these interengaging members are visible from outside the lamp. If this lamp were to be mounted in an interior, it would have to be manufactured in many colors in order to match the colors of the interiors. Still further, electrical leads are also visible in this lamp.

Finally, an attaching arrangement is disclosed for headlights for motor vehicles in German Gebrauchsmuster 83 03 898 in which a protruding bracket and a tongue-shaped ear (having a hook) are formed on a housing of elastic material. An edge of a reflector has a shoulder with which it is fixedly held in the manner of a clamp because the hook engages the shoulder. The structure of the lamp cannot be understood from this publication. This attaching arrangement should achieve a clamping of the reflector edge on the housing and a self-guiding, functional, positioning of the reflector.

Building on the known vehicle lamp from German Gebrauchsmuster 77 39 340, it is an object of this invention to provide a vehicle lamp having the characteristics set forth in the preamble of claim 1 which is mountable in an interior of a vehicle in which a visible surface of the vehicle lamp, after it is mounted, can be easily matched with a color arrangement of a vehicle interior in a simple manner, whereby the same housings can be used for all decoration color schemes. Still further, the visible surfaces should be smooth and neither electrical contact elements nor interengagement elements should be visible.

SUMMARY

The stated object is achieved by placing a removable covering cap over a housing, with the covering cap's outer surface being shaped to match a mount location of the lamp—thereby forming its visible surfaces—, with spring snapping tongues formed on exterior surfaces of side portions of the housing having outwardly protruding catch noses for gripping behind snapping engaging elements mounted on the interior of the covering cap, and the removable covering cap having flexible detaching lashings bendable about defined axes for releasing the catch noses of the spring snapping tongues from the snapping engagement elements upon application of an inward force on the removable covering cap from outside, at the catch noses.

By means of the removable covering cap it is now possible that the housing can be manufactured in one color for all color schemes. In order to match colors, only the removable covering cap must be manufactured in the required colors. Because of this, it is also possible to manufacture the housing and the removable cap of disparate plastic materials. The covering cap can be formed so that its outer visible surfaces are smooth and so that all components arranged on the housing are unseen. Removal of the covering cap from the housing is brought about in an uncomplicated manner, although the self-snapping and/or latching elements are unseen, because the detaching lashings, for example, can be moved toward one another by a thumb and finger of one hand. The snapping tongues, for a mounted covering cap, are related to the detaching lashings such that they are either contacting or slightly separated from them so that a bending angle of the detaching lashings can be maintained small. The vehicle lamp of this invention in the form of a brake light will normally be mounted on a hat shelf at a rear of a passenger motor vehicle so that the light body is spaced slightly from an interior surface of the rear window. The covering cap can be removed without a tool because the spring snapping tongues can be moved toward one another by means of the detaching lashings. If the engaging elements were mounted on the interior of the detaching lashings in such a manner that they would grip behind catch noses of the spring snapping tongues, the detaching lashings would have to be urged outwardly or the snapping tongues would have to be pressed inwardly in order to take off the covering cap. Then tools would be necessary. Because the detaching lashings have a uniform thickness, no indented areas on the interior result due to a material accumulation.

In a further embodiment of the invention it is provided that each detaching lashing is formed by a slit which extends in a curve. Even if the width of the slit is quite small a user can easily recognize where forces must be applied to remove the covering cap. It comes natural to apply the forces to free ends of the detaching lashings. The bending lines of the detaching lashings are defined by opposite ends of the curved slits. The slits can be, in a beneficial and economic manner, produced by an appropriate mold layout during injection molding. In a practical manner, the light body is formed as a light-transmissive shield with an adjacent edge of the housing or the covering cap supporting a surrounding elastic profile seal. The vehicle lamp can then be mounted in the interior of the vehicle so that the profile seal lies sealingly against an interior surface of the rear window pane so that when it is illuminated no light rays escape into the interior of the motor vehicle, which would, particularly when it is dark, annoy passengers. To facilitate a placing of the covering cap on the housing, positioning lugs are provided on opposite side portions of the interior surface of the covering cap and on corresponding exterior side portions of the housing.

The vehicle lamp is particularly economical to manufacture if the reflector and the housing are molded as one piece, preferably, as a one piece resinous-plastic molded part. In this manner, a molding tool is eliminated as is a need to mount the reflector in the housing. The reflector surface will be inspected in a known manner.

The invention will be described below in more detail with reference to attached drawings.

DETAILED DESCRIPTION OF THE INVENTION

Figure 2:
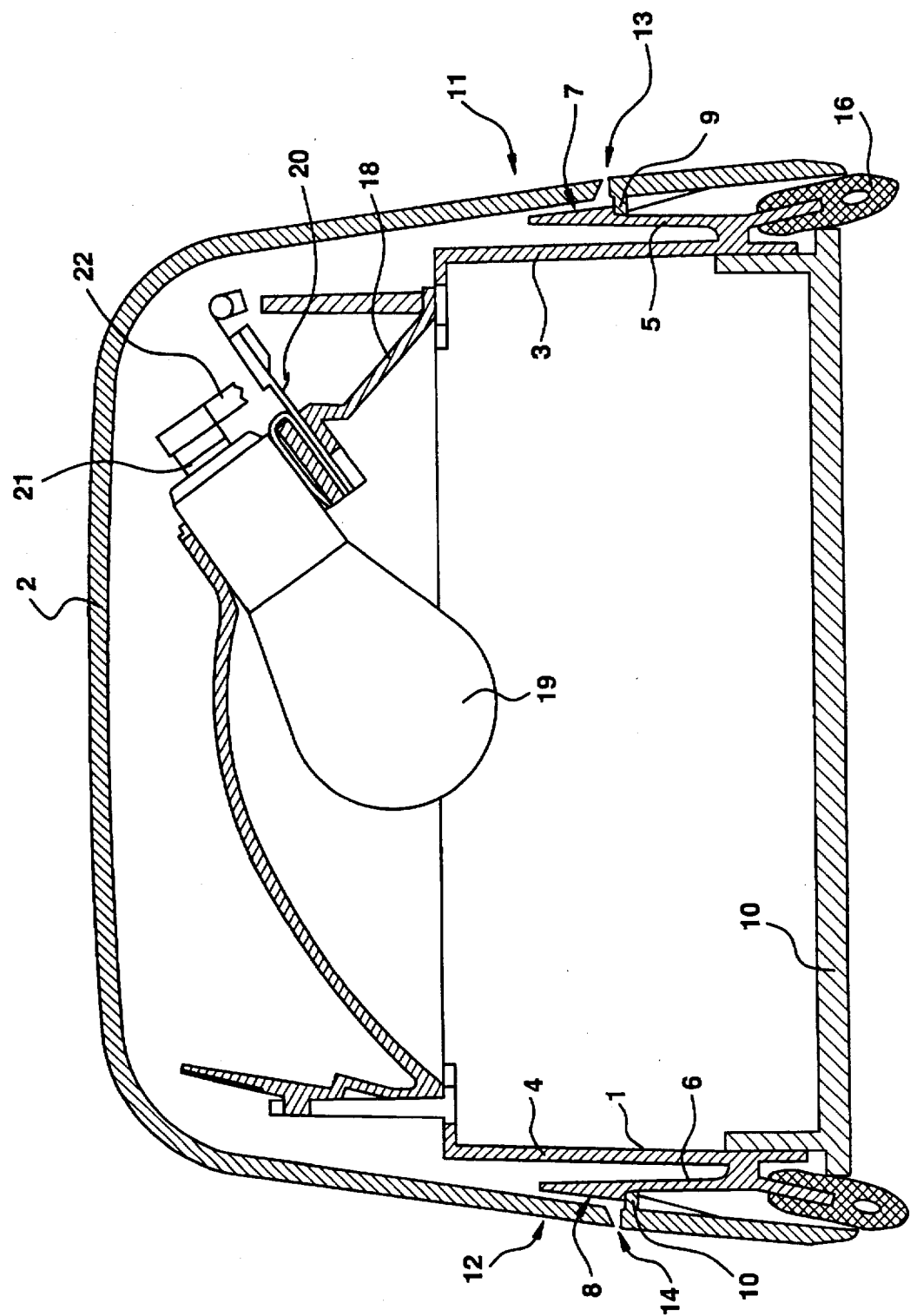
FIG. 2 is a horizonal cross sectional view of the vehicle lamp of FIG. 1 taken along the line II—II in FIG. 1.
Figure 3:
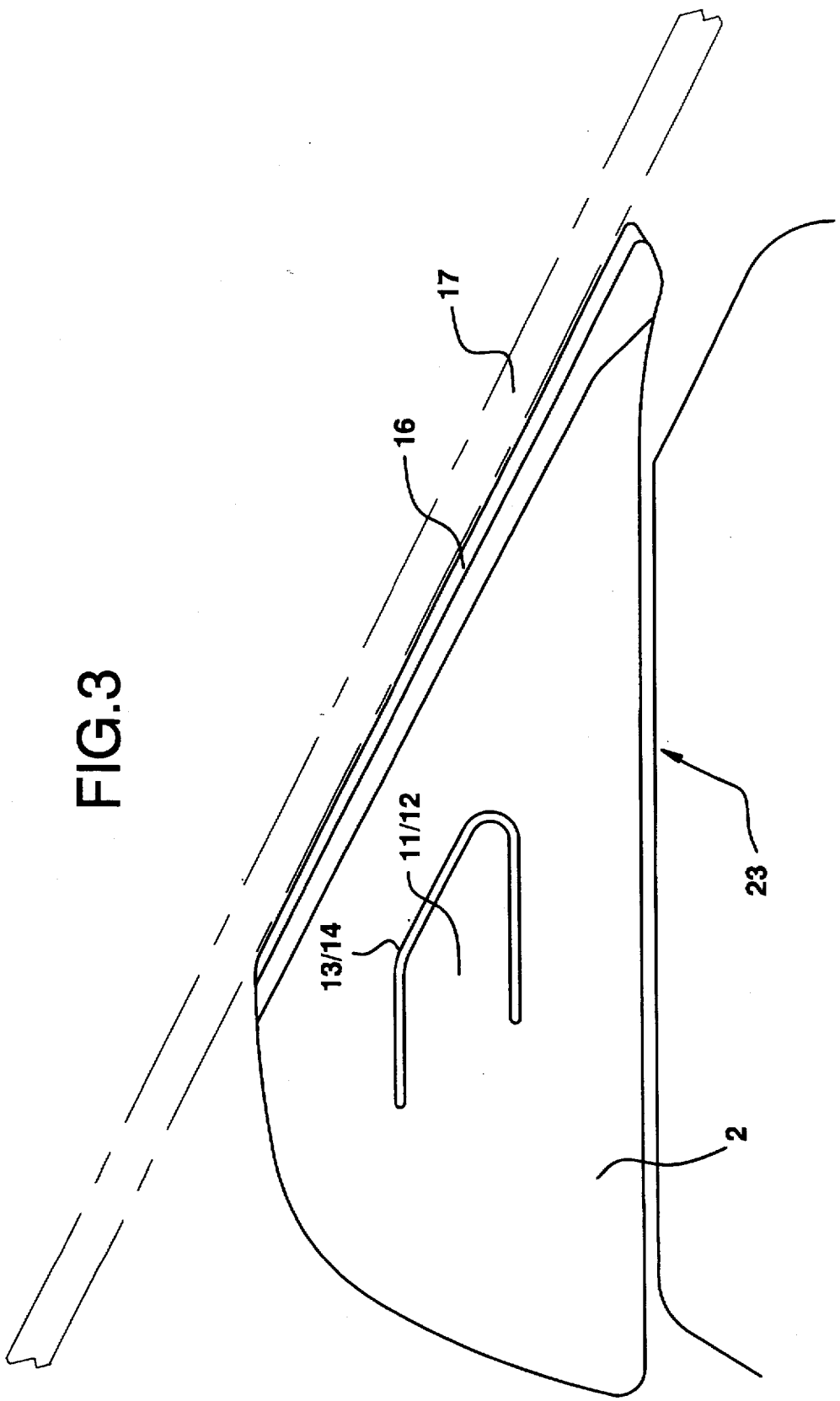
FIG. 3 is a side view of the vehicle lamp.

The vehicle lamp depicted in the drawings includes a wedge shaped housing 1 over which a covering cap 2 is placed. Two oppositely lying snapping tongues 5, 6 are on exteriors of side parts 3, 4 of the housing 1 which are provided with outwardly flexible catch noses 7, 8, which form free end areas of the snapping tongues 5, 6 which taper inwardly toward their free ends. Areas opposite the free ends include bending axes of the snapping tongues 5, 6. Snapping engaging elements 9, 10 are formed on the interior of the covering cap 2 which grip behind the catch noses 7, 8 of the snapping tongues 5, 6 so that the covering cap 2 is held both by shaped and keyed interengagement, because the snapping tongues 5, 6 are not untensioned. FIG. 2, in combination with FIG. 3, shows that two detaching lashings 11, 12, formed by curved slits 13, 14, are provided in the covering cap 2 in areas corresponding to the snapping tongues 5, 6. Free ends thereof, which are opposite bending axes thereof, lie in engagement areas of the snapping engaging elements 9, 10 with the catch noses 7, 8 however, separated slightly from the snapping engaging elements 9, 10. Accordingly, the bending axes of the snapping tongues 5, 6 and the detaching lashings 11, 12 lie to opposite sides, near the snapping-engagement areas. It can be particularly seen in FIG. 2 that external pressure on the free end areas of the detaching lashings 11, 12 disengage the catch noses 7, 8 of the snapping tongues 5, 6 from the snapping engagement elements 9, 10 so that the covering cap 2 can be removed from the housing 1.

Figure 4:
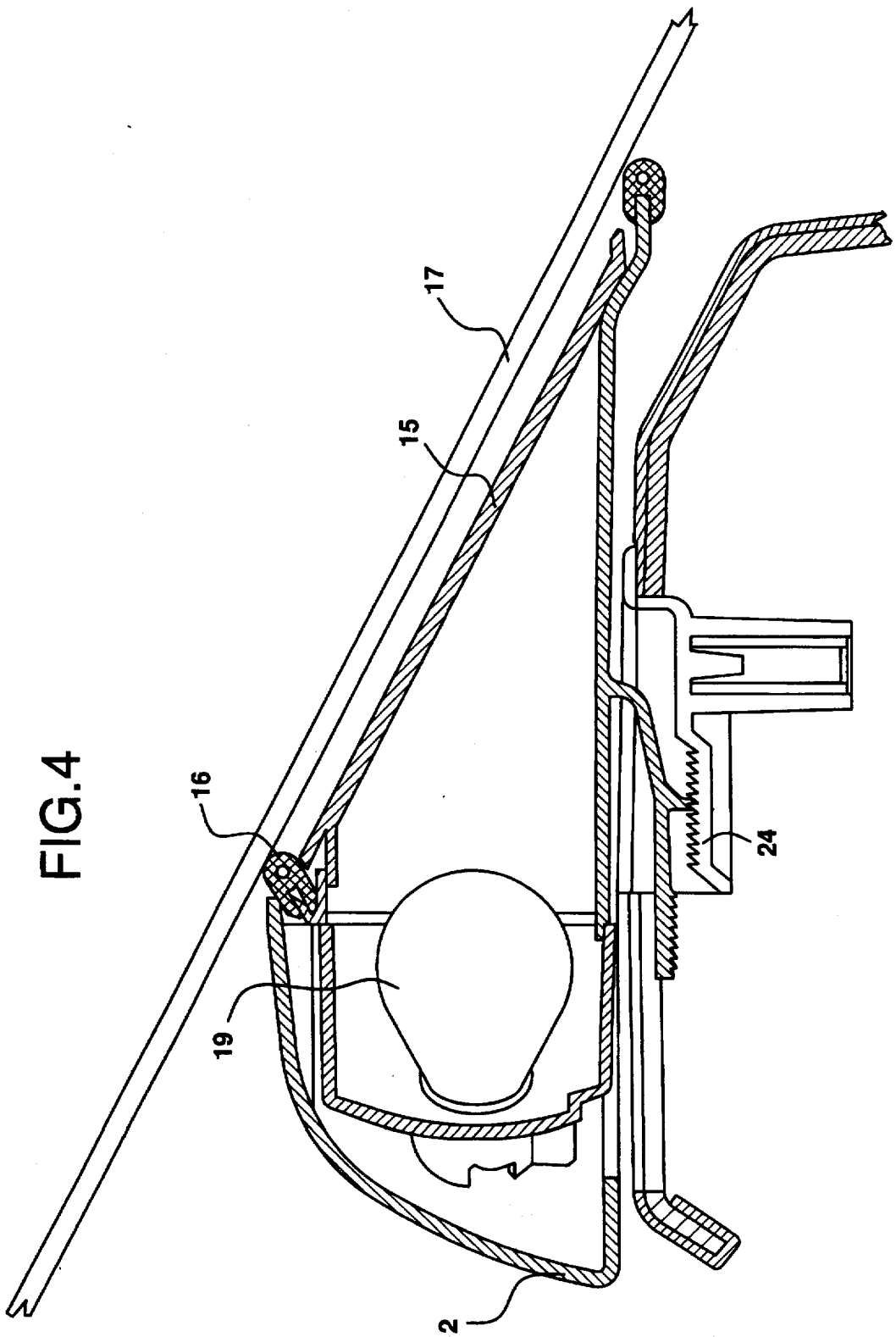
FIG. 4 is a vertical cross sectional view of the lamp taken on line IV—IV in FIG. 1.

The vehicle lamp is provided with a light-transmitting pane 15 for forming the light body, which is clipped to the housing 1 in a manner not further described and which closes a large opening in the wedge-shaped housing 1. An edge of the housing 1 which borders the light-transmitting pane 15 supports a surrounding elastic profile seal 16. In FIGS. 3 and 4 a rear window 17 of a vehicle is generally indicated. FIG. 4 shows that the profile seal 16 lies against an interior surface of the rear window 17 so that during illumination no light rays enter the motor vehicle interior.

The housing 1 and the covering cap 2 are provided with positioning lugs (not shown), which are formed on the inner surface of the covering cap 2 and the outer surface of the housing 1 to make it easier to cover the housing 1 with the covering cap 2. When this is done, because the snapping tongues 5, 6 are urged from the outside by the snapping engaging elements 9, 10, the catch noses 7, 8 have inclined outer surfaces.

A reflector 18, with a socket for a lamp 19, is snappingly affixed within the interior of the housing 1. Contrary to the depicted embodiment, the reflector 18 can be formed as a one piece plastic molded part, with a reflector surface having a reflecting coating provided thereon.

Figure 1:
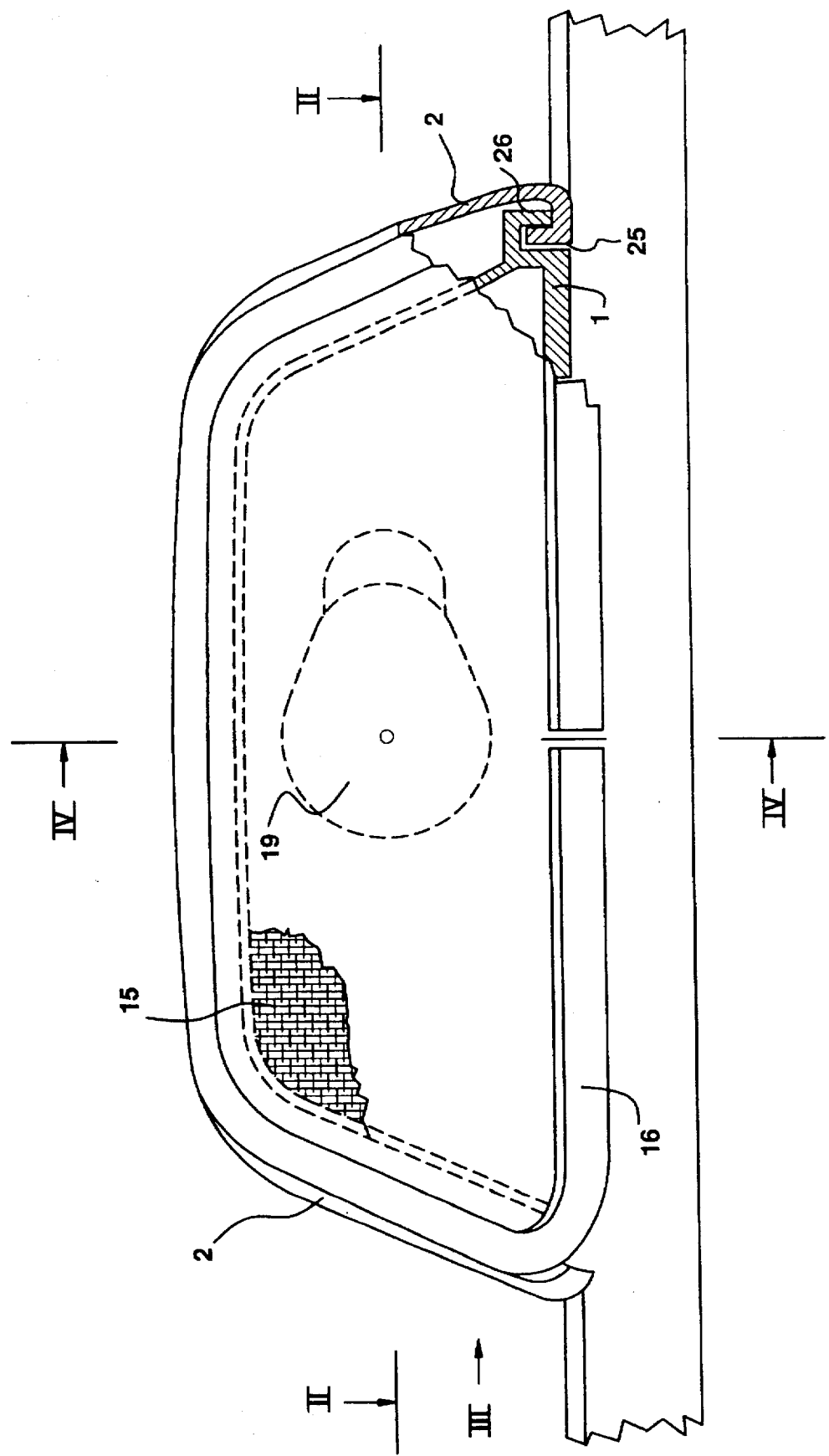
FIG. 1 is a facing view of a vehicle lamp of this invention with a view of a reflector plate.

The housing 1 is further provided with various electrical terminal elements. Reference numerals 20, 21 represent two contact springs. Reference numeral 22 is an electrical lead. In FIGS. 1, 3 and 4 it can be seen that the vehicle lamp can be mounted in a wedge shaped space above a, roughly-depicted, hat shelf 23 by means of a holder 24 which is not described. It can be seen in FIGS. 1-4 that the outer surface of the covering cap 2 forms a visible surface of the vehicle lamp when it is mounted on the hat shelf 23. It can be seen in FIG. 2 that the lamp 19 can be easily changed once the covering cap 2 is removed.

In one embodiment the interior surface of the covering cap 2 has positioning lugs 25 on opposite parts thereof (only one part being shown in FIG. 1) and there are positioning lugs 26 on adjacent exterior side parts 3, 4 of the housing 1 for interengaging therewith.

The invention claimed is:

1. A vehicle lamp mountable in a cab of a motor vehicle, particularly for use as a raised brake light, including:

a housing (1) having a transparent light body (15) affixed thereto, said housing and said light body enclosing a light source (19), a reflector (18) and electrical leads (20, 21, 22); and a removable covering cap including an enclosure wall (2) placed over the housing (1) to thereby substantially hide said housing from view, with an exterior surface of the enclosure wall forming a visible surface, said enclosure wall being formed to fit a mount for the vehicle lamp; wherein:

exterior surfaces of side portions (3, 4) of the housing (1) have spring snapping tongues (5, 6) formed thereon with outwardly protruding catch noses (7, 8) thereon for gripping behind snapping engaging elements (9, 10) formed on an interior surface of the enclosure wall of the covering cap (2) for holding said covering cap on said housing; and the enclosure wall of the covering cap (2) has flexible detaching lashings (11, 12), which are bendable about defined axes, for engaging the spring snapping tongues (5, 6) and moving the spring snapping tongues so as to release their catch noses from engagement with the snapping engaging elements (9, 10) upon application of an external force to said flexible detaching lashings.

2. A vehicle cap as in claim 1 wherein each detaching lashing (11, 12) is formed by a curved slit (13, 14) in the enclosure wall of said removable cover cap, with the defined axis extending between ends of the curved slit.

3. A vehicle lamp as in claim 1 wherein the light body is formed as a light-transmitting pane (15), and wherein an edge of the housing (1), adjacent the light-transmitting pane, has a surrounding elastic profile seal (16).

4. A vehicle lamp as in claim 1 wherein an interior surface of the covering cap (2) has positioning lugs (24) on opposite side parts thereof and wherein there are positioning lugs on adjacent exterior side parts (3, 4) of the housing (1) for inter-engaging with the positioning lugs on the covering cap.

5. A vehicle lamp as in claim 1 wherein the reflector (18) and the housing (1) are formed as one piece of material.

6. A vehicle lamp as in claim 5 wherein the reflector (18) and the housing (1) are formed as a one piece plastic molded part.

* * * * *